United States Patent [19]
McGuffin
[11] Patent Number: 4,859,387
[45] Date of Patent: Aug. 22, 1989

[54] BEADER DRUM METHOD

[75] Inventor: James E. McGuffin, West Monroe, La.
[73] Assignee: Columbian Chemicals Company, Atlanta, Ga.

[21] Appl. No.: 148,615
[22] Filed: Jan. 26, 1988
[51] Int. Cl.[4] ..... B29B 9/08
[52] U.S. Cl. ..... 264/117; 23/314; 425/222
[58] Field of Search ..... 264/117, 114; 425/222; 23/314, 313 R, 313 FB, 313 P

[56] References Cited

U.S. PATENT DOCUMENTS

| | | | |
|---|---|---|---|
| 1,980,130 | 11/1934 | Fasting | 425/222 |
| 2,638,625 | 5/1953 | Studebaker et al. | 23/314 |
| 2,834,044 | 5/1958 | Antonsen et al. | 23/314 |
| 2,984,860 | 5/1961 | Thomas | 425/222 |
| 3,446,218 | 5/1969 | Stirling | 23/313 P |
| 3,535,412 | 10/1970 | Driscoll | 264/117 |
| 3,593,372 | 7/1971 | Driscoll | 264/117 |
| 4,563,315 | 1/1986 | Walter et al. | 264/8 |
| 4,639,383 | 1/1987 | Casey | 118/303 |
| 4,686,115 | 8/1987 | Majer | 264/117 |

*Primary Examiner*—Jan H. Silbaugh
*Assistant Examiner*—Mary Lynn Fertig
*Attorney, Agent, or Firm*—Jones, Askew & Lunsford

[57] ABSTRACT

A carbon black beader drum having a plow-like member extending into the moving bed of beads within the drum. The member parts the surface of the moving bed, and carbon black in powder form is added to the beader drum by placement into the impression or furrow created in the moving bed by the member. The added powder is covered a short distance behind the member, preventing the powder from depositing on the inner surface of the beader drum.

1 Claim, 2 Drawing Sheets

BEADER DRUM METHOD

FIELD OF INVENTION

This invention relates in general to the preparation of a beaded carbon black product, and in particular relates to improvements in the apparatus and method of introducing powdery material into a bed of beads within a rotating drum.

BACKGROUND OF THE INVENTION

The manufacture of carbon black produces carbon black in the form of a fine dust-like fluffy powder. Carbon black in its powder form is difficult to handle and transport, as the product readily forms an airborne suspension of its finely-divided particles. Moreover, carbon black in powder form has a relatively low density and is not readily compactable, so that manufacturers or users of carbon black must handle and pay shipping charges on a relatively large volume of product to obtain a given mass of carbon black for various end-use applications.

It is known in the art to agglomerate the carbon black in powder form to form granules or beads of carbon black. The density of the resulting beaded carbon black product is greater than that of carbon black powder, permitting shipment of a greater mass per unit volume of beaded carbon black. Furthermore, carbon black in beaded form remains a fluent product for handling and shipping in bulk, while greatly reducing the amount of carbon black which becomes airborne during handling, and correspondingly reducing the health hazard and waste arising whenever carbon black in powder form is shipped in bulk.

Carbon black beading apparatus of the prior art typically includes a rotating drum mounted on a nearly-horizontal axis. A feed pipe extends some distance inside the rotating drum, with the feed pipe usually approximately coaxial with the drum. A feed screw is incorporated within the pipe, and carbon black in powder form is fed through the pipe and allowed to fall from the pipe outlet onto a bed of carbon black beads established within the rotating drum. Optionally, carbon black in beaded form is fed into the drum with the powder, if needed to maintain the desired relative proportion of beads within the drum. When the beader drum is initially started, carbon black in fluffy powder form is introduced to the drum, normally in conjunction with seed beads, until the inside wall of the drum is coated with the powder, and continuing rotation of the drum and flowing action of the powder therein starts forming a bed of carbon-black beads in the drum. Powder carbon black is added to form more beads, and the beads of carbon black are continuously withdrawn from one end of the drum.

The mixture of beads and powder in the drum forms a fluent bed within the drum, and this bed is carried partway up one side of the drum as the drum rotates. For example, if the drum when observed from the exit end is rotating counterclockwise, the bed of beads is carried up the right side of the drum to an angle determined by the type of material, the inner drum surface, and the diameter and rotating speed of the drum. The incoming carbon black powder falls from the outlet end of the feed pipe onto the upper surface of the bed existing in the drum, forming a top layer which actually flows to the left (assuming the foregoing example of counterclockwise rotation) due to the bed angle created by rotation of the drum. Because of this bed angle, the center of the bed in the drum is no longer directly beneath the outlet of the powder infeed pipe, and the incoming carbon black powder is thus deposited on what amounts to the leading edge of the bed within the drum. Because the top layer or surface of the bed flows in the direction toward the leading edge of the bed, the incoming carbon-black powder may be deposited on the drum surface prior to complete incorporation within the existing carbon-black bed of beads. The incoming powdery material thus tends to remain on the surface of the bed or to adhere to the drum wall, instead of becoming readily and completely distributed throughout the bed. More of the incoming dust thus becomes caked on the drum without attaching itself to the beads already formed within the drum. As the existing beads are being withdrawn from the drum, a condition called "dust out" can occur where substantially no beads remain in the drum. When this happens, the production of beads is suspended while drum rotation continues for the time required to reestablish a bed of beads within the drum. This bed rebuilding time is wasteful nonproductive down-time for the beader drum, thereby increasing the cost of producing carbon black beads.

SUMMARY OF THE INVENTION

Stated in general terms, the present invention introduces powdery material into the existing bed at a location in advance of the leading edge of the bed, and buries the introduced material within the bed before the introduced material reaches the leading edge. This introduction is accomplished by perturbing the bed at one or more locations along the length of the beader drum. This perturbation creates an impression in the moving bed of beads, and the incoming carbon black powder is then placed into the impression. The top layer of beads quickly flows over and covers the impression containing the newly-added powder as the drum rotates. A layer of beads is thus interposed between the drum wall and the incoming powder, and little or none of the incoming powder is directly deposited on the drum wall. By surrounding the powder with beads, the surface area for powder distribution is increased, yielding a desirable decrease in the powder-to-bead ratio.

Stated in somewhat greater detail, a beader drum according to the present invention incorporates a member extending into the flowing bed of beads within the drum. This member parts the surface of the moving bed as the drum rotates, forming a furrow-like impression in the moving bed of beads, and the carbon black powder is then placed either mechanically or by gravity into the impression thus formed in the moving bed.

The bed-parting member incorporates a plow in a preferred embodiment of the invention, and this plow extends into the bed of beads and parts the surface of the moving bed. At a point immediately behind the plow, carbon black powder is introduced into the impression or furrow created as the moving bed flows past the plow.

Thus, it is an object of the present invention to provide an improved apparatus and process for converting powder carbon black to carbon black beads.

It is another object of the present invention to provide an improved beader drum apparatus and process for incorporating carbon black powder into a bed of beads.

It is a further object of the present invention to provide an improved apparatus and process for introducing a powdery material into a rotating drum containing a quantity of fluent material.

Other objects and attendant advantages of the present invention will become more readily apparent upon considering the following preferred embodiment of the invention.

DETAILED DESCRIPTION OF PREFERRED EMBODIMENT

Figure 1:
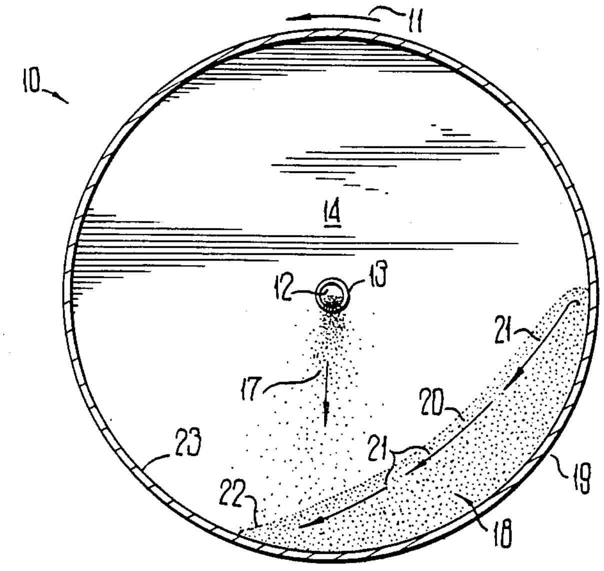
PRIOR ART FIG 1
FIG. 1 is a schematic vertical section view illustrating the operation of a prior-art beader drum.

Turning first to FIG. 1, there is shown generally at 10 a beader drum apparatus typical of the prior art. The drum 10 is mounted and driven for counterclockwise rotation as seen in the figure and as indicated by the directional arrow 11. Carbon black in powder form, optionally mixed with a supply of carbon black beads, is supplied to the drum 10 through the outlet 12 of the feed pipe 13, which extends a distance inwardly from the inlet end 14 of the drum. A feed screw (not shown) within the feed pipe 13 provides a constant delivery of powder to the outlet 12 of the feed pipe.

For the purpose of the present explanation, it is assumed that a fluent bed 18 of beaded carbon black material is already present within the beader drum 10. Because the drum 10 is rotating counterclockwise, the bed 18 of beads is carried up the right side 19 of the drum 10 to an angle determined by kind of material and by drum specifications and speed, as discussed above. The top layer 20 of the bed 18 thus flows downwardly and to the left by gravity, as indicated by the arrows 21, as the beader drum 10 rotates. The center of the bed 18 is no longer directly beneath the powder 17 falling from the outlet 12, due to the angle of the bed, and so the incoming powder is deposited on or near the leading edge 22 of the bed. Because the top layer 20 of the bed is flowing toward the leading edge 22, some of the incoming powder is deposited on the inner surface 23 of the drum 10 before the incoming powder is completely incorporated within the bed. The powder thus is not readily distributed throughout the bed by introducing the powder onto the bed surface, thereby reducing the efficiency of the beader drum.

Figure 2:
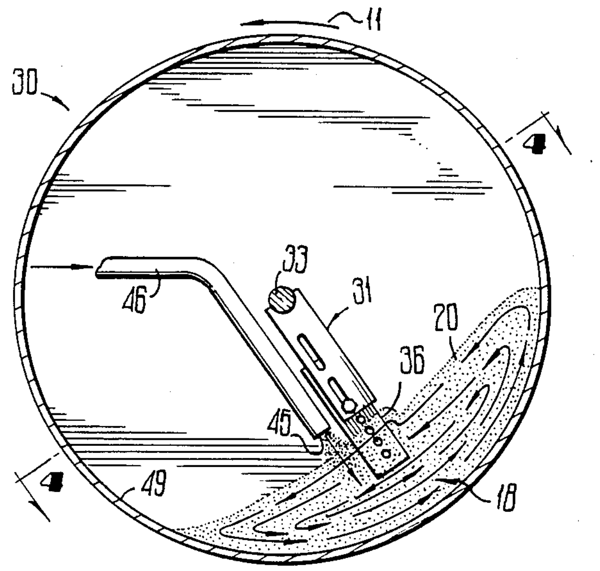
FIG. 2 is a schematic vertical section view illustrating the operation of a beader drum according to a preferred embodiment of the present invention.

Turning now to FIG. 2, the beader drum 30 according to the disclosed embodiment of the present invention includes a plow 31 fixed at a stationary angular position within the rotating drum. The plow 31 is mounted on the center shaft 33 extending longitudinally within the drum 30, and extends radially from the center shaft to terminate at an outer end 32 which extends into the bed 18 of beads as the bed is carried up one side of the drum 30 while the beader drum operates. The angular orientation of the plow 31, relative to the axis of rotation of the drum 30, varies according to the angle of the bed 18; in an actual embodiment of the present invention, the plow 31 is located counterclockwise approximately 33° from vertical, although that angle is not considered critical.

Figure 3:
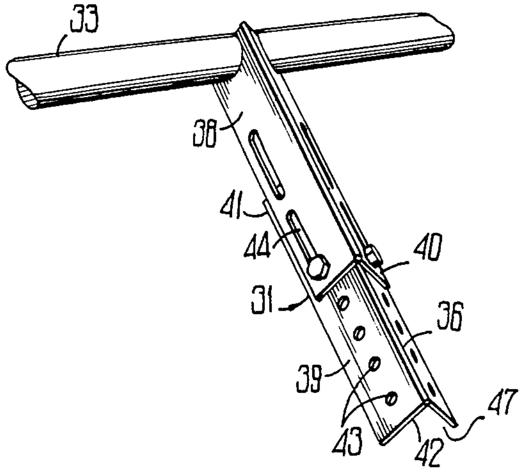
FIG. 3 is a pictorial view showing the plow element used in the embodiment of FIG. 2.

FIG. 3 shows a more detailed view of the plow 31, which is V-shaped in cross section with the leading edge 36 of the V confronting the downwardly-moving top layer 20 of the bed 18. The plow 31 is fabricated from a pair of V-shaped angle members 38 and 39, with the proximal end of the first such member 38 secured to the center shaft 33. The distal end 40 of the member 38 overlaps the proximal end 41 of the second angle member 39. The two angle members 38 and 39 are interconnected by one or more bolts extending through the holes 43 and overlapping slots 44 in the two angle members, placing the distal end 42 of the member 39 at a location which parts the surface of the moving bed 18 as previously described.

Located within the beader drum 30 is the powder inlet 45, seen in FIG. 2. The powder inlet 45 comprises the discharge end of a powder feed tube 46, through which is introduced carbon black in powder form through any appropriate feed mechanism such as a feed screw or the like. The powder inlet 45 is preferably positioned immediately behind the space 47, FIG. 3, formed between the two sides of the V-shaped plow 31.

Figure 4:
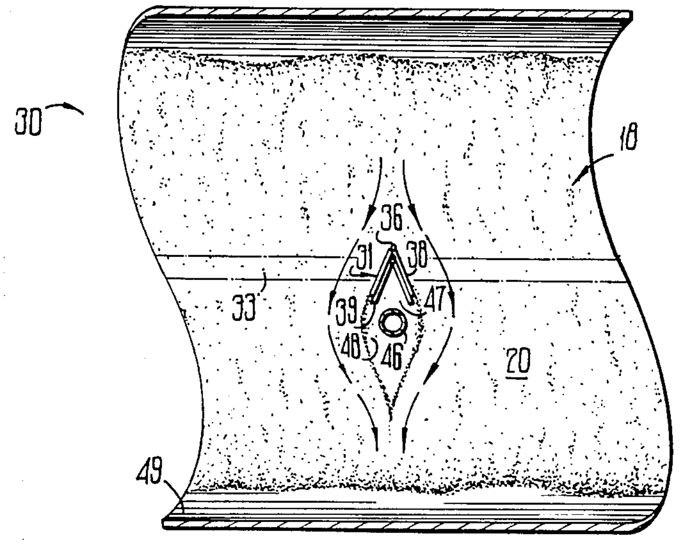
FIG. 4 is a pictorial view showing the furrow created in the operation of the disclosed embodiment.

The operation of the beader drum 30 is now described. Assuming for convenience that a fluent bed 18 of carbon black in beaded or granular form already exists within the rotating drum 30, the plow 31 extends into the bed of beads and parts the downwardly-moving top layer 20 of the bed as the drum 30 rotates, producing the furrow 48 behind the plow as best shown in FIG. 4. Incoming powdery carbon black enters the drum through the powder inlet 45, and this powder carbon black enters the impression or furrow 48 created in the moving top layer 20 by the plow 31. A short distance behind the plow, relative to the downward flow of the top layer 20, the beads parted by the plow flow back to cover the furrow 48 now containing the powder. The powder thus is substantially or completely surrounded by a layer of beads before the powder reaches the drum inner surface 49. As a result, little or no added powder is directly deposited on the drum surface 49. Moreover, surrounding the added powder with beads decreases the powder-to-bead ratio, which allows faster incorporation of the powder and causes faster bead formation. Because the incoming powder is covered with beads before reaching the drum surface, powder build-up on the drum surface is greatly decreased and production of beads is speeded up. Consequently, shorter and less costly beader drums are possible with no decrease in the rate of bead production.

It should be understood that the foregoing relates only to a preferred embodiment of the present invention, and that numerous changes and modifications therein may be made without departing from the spirit and scope of the invention as defined in the following claims.

What is claimed is:

1. The process of introducing a powdery material into a fluent bed of beaded material within a rotating beader drum, comprising the steps of:

placing a bed of fluent beaded material within the drum such that the beaded material tends to travel part-way up one side of the rotating drum, so that a surface layer of beads in the bed flows by gravity down the bed as the drum rotates;

creating an open furrow in the surface layer at a location up the one side of the rotating drum; and introducing the powdery material into the open furrow on the surface layer, and then covering the powdery material with the fluent beaded material of the surface layer as the beaded material flows to close the furrow while the drum rotates, thereby enclosing the powdery material before the powdery material can contact the drum.

* * * * *